United States Patent [19]

Chio et al.

[11] 4,340,954
[45] Jul. 20, 1982

[54] STYLUS TIP FABRICATION FROM A SYNTHETIC DIAMOND STONE

[75] Inventors: Shiu-Shin Chio; George A. Kim, both of Indianapolis, Ind.

[73] Assignee: RCA Corporation, New York, N.Y.

[21] Appl. No.: 174,865

[22] Filed: Aug. 4, 1980

[51] Int. Cl.³ .............................................. G11B 3/44
[52] U.S. Cl. .................................. 369/173; 51/283 R
[58] Field of Search ....................... 369/173; 29/169.5; 51/125, 283 R

[56] References Cited

U.S. PATENT DOCUMENTS

| | | | |
|---|---|---|---|
| 1,041,983 | 10/1912 | Edison | 369/173 |
| 1,914,658 | 6/1933 | Funk | 369/173 |
| 2,173,763 | 9/1939 | Olsen | 369/173 |
| 3,383,752 | 5/1968 | Hukao et al. | 369/173 X |
| 3,848,876 | 11/1974 | Joschko et al. | 369/173 |
| 3,877,705 | 4/1975 | Joschko et al. | 369/173 |
| 3,943,276 | 3/1976 | Knitter | 369/126 |

Primary Examiner—Charles E. Phillips
Attorney, Agent, or Firm—Birgit E. Morris; Donald S. Cohen; Thomas H. Magee

[57] ABSTRACT

A stylus tip is fabricated from a portion of a synthetic diamond stone having a plurality of facets oriented along the {100} family of planes. The portion is bounded by a right circular cylinder having a base thereof centered along one of the {100} facets having a surface area larger than the average surface area of the {100} facets, and having a base diameter and height equal to about half the width of the one facet.

8 Claims, 6 Drawing Figures

AVERAGE INCLUSION DENSITY DISTRIBUTION

STYLUS TIP FABRICATION FROM A SYNTHETIC DIAMOND STONE

This invention relates to a stylus tip fabricated from a synthetic diamond stone.

BACKGROUND OF THE INVENTION

Information playback systems frequently utilize a stylus for reading signals from the surface of an information record, typically a plastic disc, that contains stored video and audio information. In some systems the information record has a fine spiral groove to guide the tip of a stylus that contains a thin electrode. In these systems, the stylus tip is made of a material having sufficient hardness to withstand the abrasion caused from tracking the groove. Materials which possess such hardness, for example diamond, generally have a crystallographic structure which presents surfaces exhibiting different qualities depending upon which crystallographic planes the surfaces are oriented along. Consequently, in manufacturing styli from these crystallographic materials for use in video disc playback systems, it is important to know and maintain the tip orientation. The present invention provides a novel technique for fabricating quickly and efficiently a high-quality stylus tip from a specific portion of a synthetic diamond stone.

SUMMARY OF THE INVENTION

The present invention comprises a stylus tip which is fabricated from a portion of a synthetic diamond stone having a plurality of facets oriented along the {100} family of planes. The bottom is bounded by a right circular cylinder having a base thereof centered along one of the {100} facets having a surface area larger than the average surface area of the {100} facets, and having a base diameter and height equal to about half the width of the one facet.

DETAILED DESCRIPTION OF THE INVENTION

Figure 1:
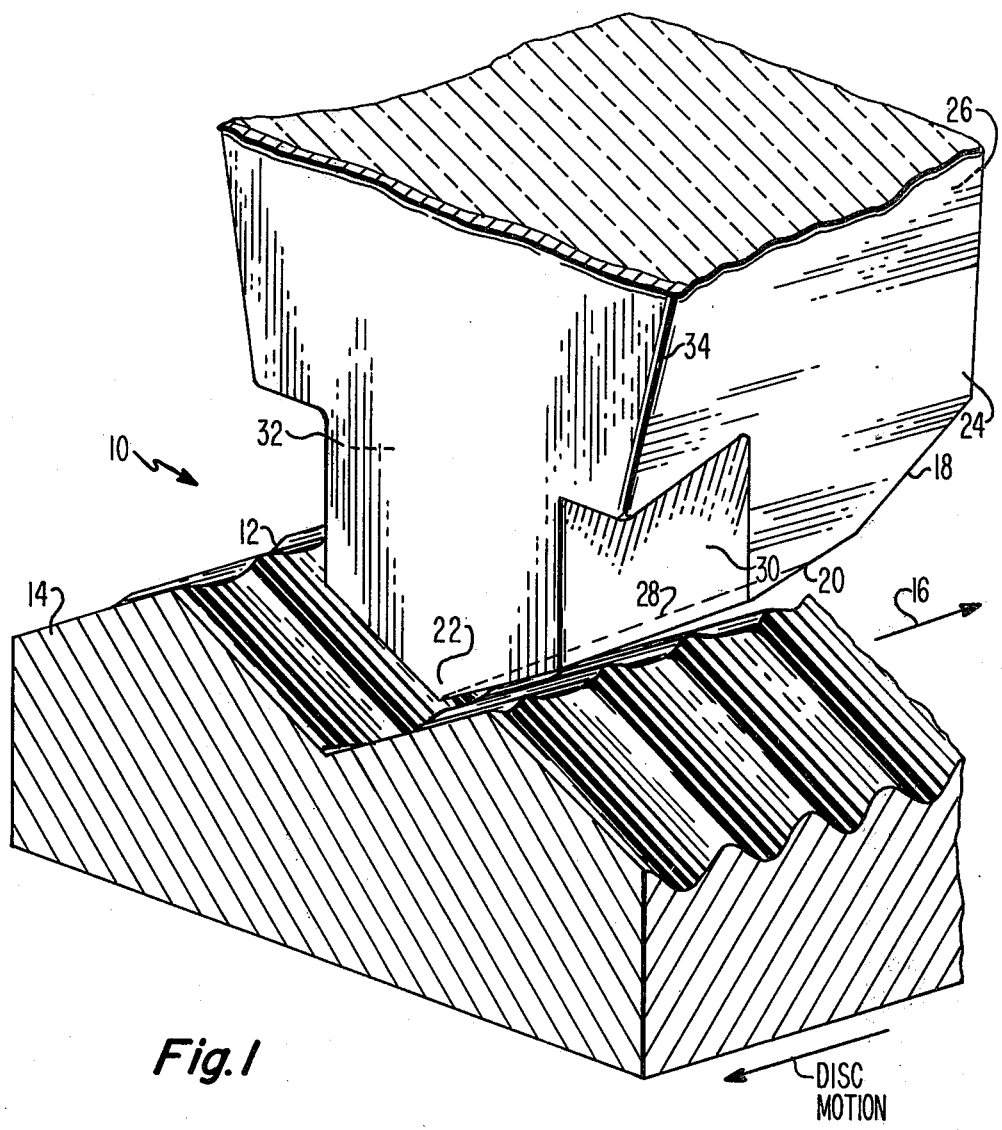
FIG. 1 is a perspective view showing one embodiment of a stylus tip tracking a groove in a surface of a video disc record.

In FIG. 1 of the drawing, there is shown one embodiment of a stylus tip 10 utilized to read signals from a surface 12 of an information record 14. The tip 10 is adapted to track a path along the surface 12 of the record 14, shown in the direction of the arrow 16, and to measure capacitive variations between the tip 10 and the surface 12 of the record 14 when relative motion is established between the tip 10 and the record 14. The tip 10 includes a prow 18 terminating at a base 20 thereof, and a stern 22 remote from the prow 18. The prow 18 and the stern 22, along with the two non-parallel side surfaces 24 and 26 of the tip 10, define a substantially triangular-shaped bottom portion 28 or shoe which is lapped in the shape of a "V" to match the shape of the surface 12 of the record 14. In the present embodiment, the side surfaces 24 and 26 are also lapped to form a keel defined by the bottom portion 28 and two substantially parallel side surfaces 30 and 32, as shown in FIG. 1. In the present embodiment, the stern 22 of the tip 10 has a thin electrode 34 disposed adjacent thereto.

Figure 2:
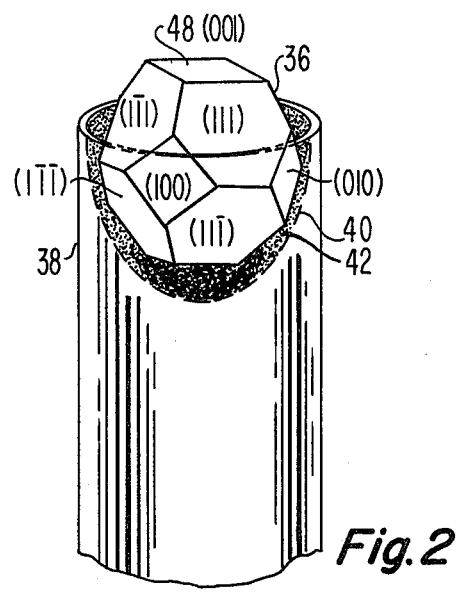
FIG. 2 is a perspective view of a cubo-octahedron synthetic diamond stone having a plurality of facets oriented along the {100} family of planes, and mounted on a shank.

In the present invention, the stylus tip 10 is fabricated from a portion of a synthetic diamond stone 36 mounted on a shank 38 as shown in FIG. 2. The tip 10 is actually shaped by a series of lapping operations which grind away sections of both the stone 36 and the shank 38. The synthetic stone 36 has a plurality of facets oriented along the {100} family of planes, and a plurality of facets oriented along the {111} family of planes. In the present example, the stone 36 comprises a cubo-octahedron stone having six {100} facets and eight {111} facets. Although the stone 36 in FIG. 2 is shown as an almost-perfect cubo-octahedron stone, in actual samples the facets, along a specific family of planes, are shaped slightly differently and have different surface area sizes. The stone 36 may be mounted in a concave-shaped cavity 40 at the end of the shank 38 by any means capable of firmly holding the stone 36 therein, such as setting the stone 36 in a pocket of adhesive epoxy 42 or the like.

In fabricating the stylus tip 10 from the synthetic diamond stone 36, we have discovered that it is important not only to maintain the tip orientation but also to avoid areas of disturbed crystallization which may be caused by impurities taken up from the solution during the crystallization process utilized to grow the synthetic stone. The general name, *inclusion*, is given to any foreign body enclosed within the stone, whatever its origin. These inclusions are extremely common; they may be either gaseous or solid; visible to the unaided eye or requiring the use of a microscope. We have observed that the presence of a large number of such inclusions at the tip-location area significantly reduces the processing yield, particularly during lapping operations.

A study was undertaken to determine the average inclusion density distribution at specific locations in a sampling of twenty-one different synthetic diamond stones. All of the stones had a 50/60 mesh size, and had a plurality of {100} facets of unequal area. The 50/60 mesh size means that stones of this size pass through a 50 mesh (per lineal inch) sieve having openings of 304 micrometers, but are retained by a 60 mesh (per lineal inch) sieve having openings of 253 micrometers. The stones were studied for inclusions by microscopic observation through one of the larger {100} facets. The typical stone thickness of an examined {100} facet pair, i.e., the thickness from the examined {100} facet to the {100} facet opposite the examined facet, was about 290 micrometers.

Figure 3:
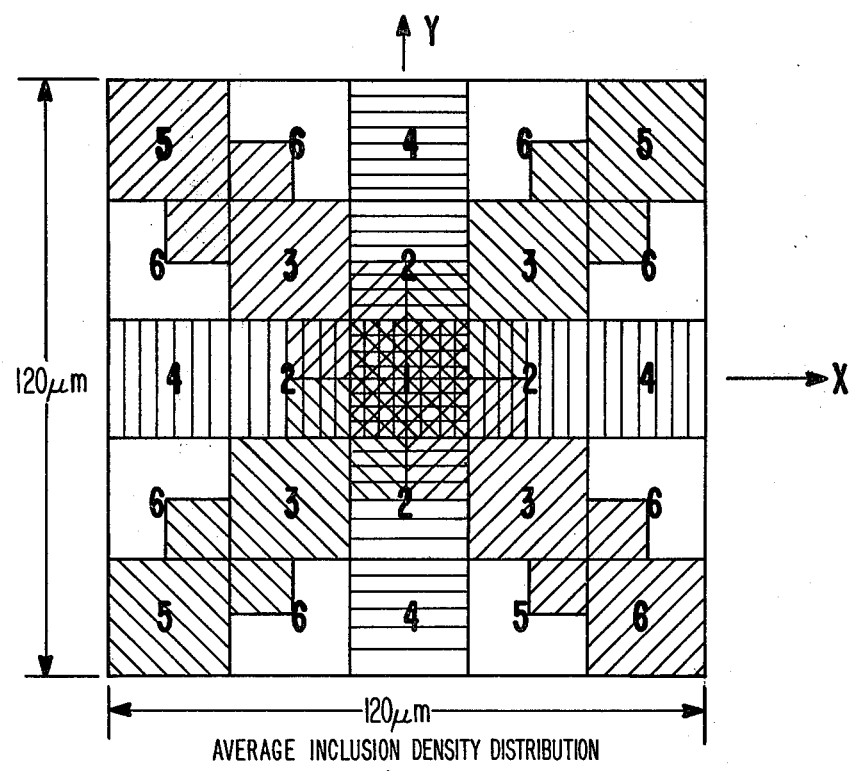
FIGS. 3 and 4 are graphs illustrating the average inclusion density distribution in a six-zone area lying in planes orthogonal to and along the z axis.

In FIG. 3 of the drawing, there is shown the average inclusion density distribution in a six-zone area lying in planes orthogonal to and along the z axis, which is the vertical axis along which the inclusions were viewed. The differently shaded areas indicate areas of similar average inclusion density. The six different zones, numbered 1 through 6 in FIG. 3, were chosen to reflect the noted asymmetric distribution of inclusions represented by the differently shaded areas. The total area covered in FIG. 3 is a 120 micrometer square.

Figure 4:
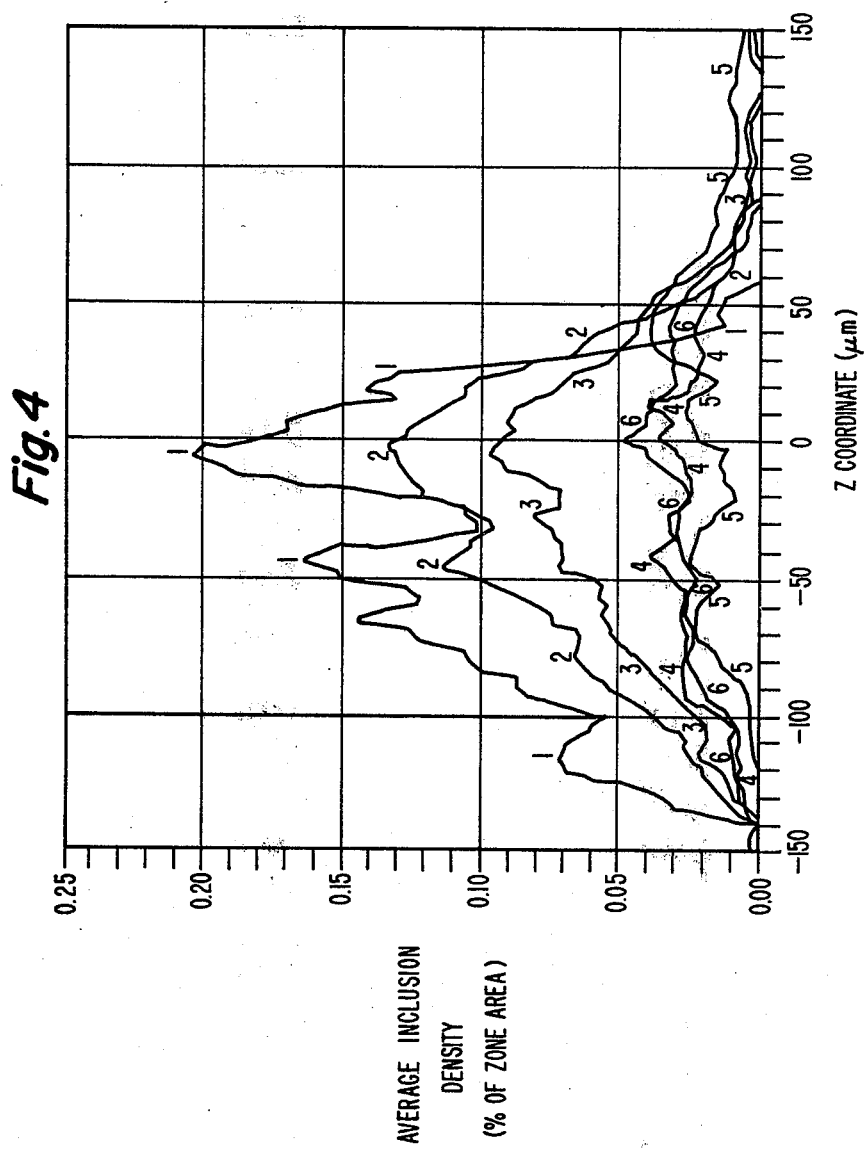

FIG. 4 of the drawing illustrates the average inclusion density of a particular zone as a function of its z coordinate, expressed as a percentage of the total zone area. One may observe from FIG. 4 that the average inclusion density of zones 1, 2, and 3 predominate and are greater in the central planes of the stones which are centered away from the larger {100} facets through which the inclusions were examined. The average inclusion density of peripheral zones 4, 5, and 6 becomes greater than that of zones 1, 2, and 3 in planes nearer to the larger {100} examined facet.

Figure 5:
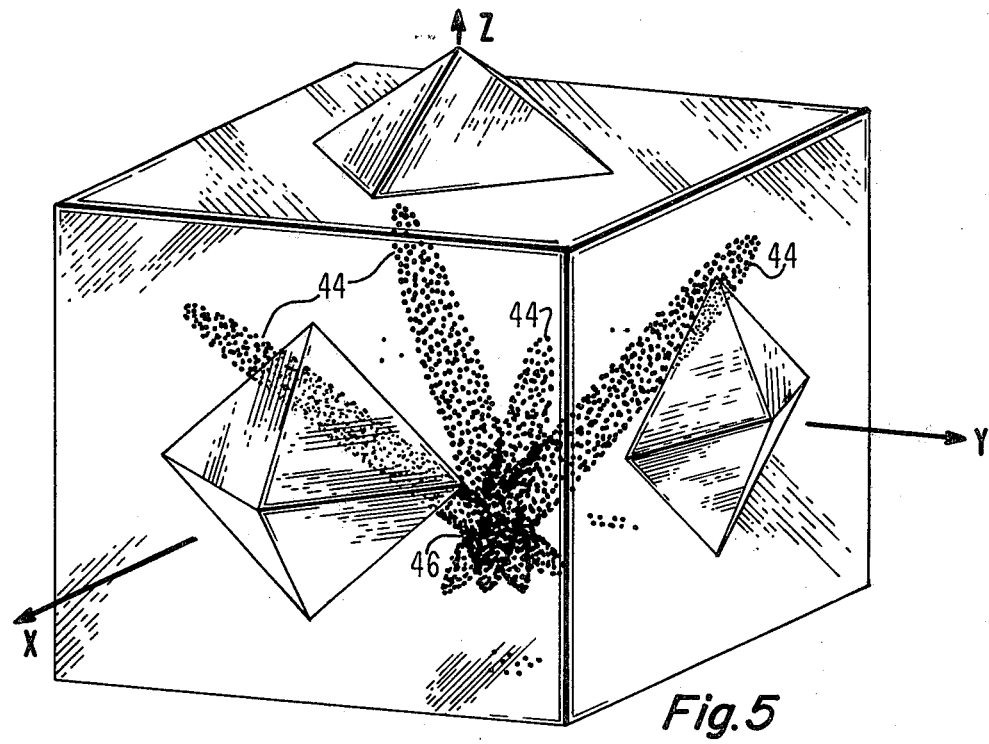
FIG. 5 is a perspective view showing an average inclusion density distribution in a sampling of twenty-one synthetic diamond stones.

FIG. 5 illustrates the average inclusion density distribution plotted in a three-dimensional view. One observes from FIG. 5 that the inclusion density distribution takes the shape of an asymmetric distribution having four elipsoids 44 pointing to the four corners of the cube formed by the {100} family of facets. However, it is important to note that the portion 46 where the elipsoids 44 intersect, i.e., the portion having the highest inclusion density, is centered away from the larger {100} facet through which the inclusions were examined.

We have concluded from our study that the portions of the stones adjacent the centers of the larger {100} facets have the lowest inclusion density. The synthetic diamond is formed spontaneously in a high-pressure apparatus, containing a metal-carbon system, upon melting of the metal which is in mechanical contact with the graphite. The apparatus insures the conduct of the process in the thermodynamic stability region of the diamond. In the course of growing the synthetic stones, the diamond is separated from the graphite by a thin layer of melted metal through which carbon atoms are transported from the graphite into the growing diamond. The total solubility of the "cubic" and "octahedral" growth pyramids change with temperature (at a given pressure). The crystal habit then depends on the growth rate of the faces, and the largest surface area of the crystal is a result of the lowest linear growth rates of the faces. In other words, the crystal is bounded by faces with the lowest growth rate. Consequently, the facet having the largest surface area oriented along the {100} family of planes results from the highest linear growth rates of the adjacent facets oriented along the {111} family of planes. In other words, the largest facet oriented along the {100} family of planes is surrounded by associated facets having the highest growth rates among the facets oriented along the {111} family of planes. Our observations on actual inclusion density distribution, combined together with the knowledge of this growing habit, lead us to hypothecate that the portions of the stone adjacent the centers of the larger {100} facets will be the portions of the stone having the lowest density of inclusions.

We propose a method of fabricating a stylus tip 10 comprising the first step of selecting from the plurality of {100} facets one facet 48 having a surface area larger than the average surface area of the {100} facets. By selecting one facet 48 having a surface area larger than the average surface area, one insures that a {100} facet is selected which is further away from the highest inclusion density portion that the smaller {100} facets. Consequently, one has a larger portion of synthetic diamond, which is relatively freer of inclusions, from which to fabricate the stylus tip 10. The stone 36 is then mounted on the shank 38 in a manner wherein the one facet 48 is positioned away from the shank 38 along a plane substantially orthogonal to the axis of the shank 38, as shown in FIG. 2. In working with synthetic stones having a 50/60 mesh size, the width of the selected one facet 48 would usually be greater than 100 micrometers.

Figure 6:
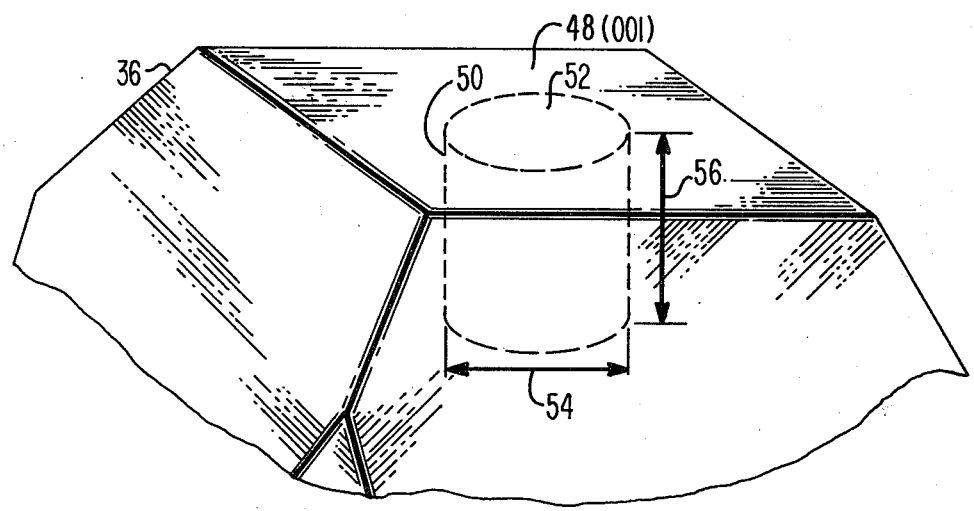
FIG. 6 is a perspective view illustrating a portion of the cubo-octahedron synthetic stone from which the stylus tip of the present invention is fabricated.

After having selected and mounted the one facet 48, the entire stylus tip 10 is then fabricated from a portion of the stone 36 bounded by a right circular cylinder 50 having a base 52 thereof centered along the one facet 48, as shown in FIG. 6. The tip 10 is actually shaped by a series of lapping operations which grind away sections of the stone 36, so that the resulting tip 10 lies entirely within the imaginary right cylinder 50. The cylinder 50 has a base diameter 54 and height 56 equal to about half the width of the one facet 48, which in the present example is greater than about 100 micrometers. If one is working with synthetic stones having a 50/60 mesh size, preferably the base diameter 54 of the right cylinder 50 is about 70 micrometers and the height 56 is about 60 micrometers.

We have discovered that the right circular cylinder 50, as described above, represents a clear and almost inclusion-free portion of the synthetic diamond stone 36. By fabricating the entire tip 10 from this relatively inclusion-free portion of the stone 36, a high-quality tip 10 is able to be manufactured in a quick and efficient manner with a significantly higher processing yield.

What is claimed is:

1. A method of fabricating a stylus tip, adapted to track a path along the surface of an information record, from a synthetic diamond stone having a plurality of facets oriented along the {100} family of planes, said facets having an average surface area, comprising the steps of:

selecting from said plurality of facets one facet having a surface area larger than said average surface area, and fabricating said entire tip from a portion of said stone bounded by a right circular cylinder having a base thereof centered along said one facet, said cylinder having a base diameter and height equal to about half the width of said one facet.

2. A method as recited in claim 1 further comprising the step of mounting said stone on a shank in a manner wherein said one facet is positioned away from said shank along a plane substantially orthogonal to the axis of said shank.

3. A method as recited in claim 1 wherein said synthetic diamond stone comprises a cubo-octahedron stone having a 50/60 mesh size, and wherein the width of said one facet is greater than 100 $\mu$m.

4. A method as recited in claim 3 wherein the base diameter of said cylinder is about 70 $\mu$m and the height thereof is about 60 $\mu$m.

5. In a stylus tip fabricated from a synthetic diamond stone having a plurality of facets oriented along the {100} family of planes, said facets having an average surface area, the improvement comprising said entire tip being a portion of said stone bounded by a right circular cylinder having a base thereof centered along one of said facets having a surface area larger than said average surface area, said cylinder having a base diameter and height equal to about half the width of said one facet.

6. A stylus tip as defined in claim 5 in combination with a shank having said stone mounted thereon such that said one facet is positioned away from said shank along a plane substantially orthogonal to the axis of said shank.

7. A stylus tip as defined in claim 5 wherein said synthetic diamond stone comprises a cubo-octahedron stone having a size equated with a 50/60 mesh sieve, and wherein the width of said one facet is greater than 100 μm.

8. A stylus tip as defined in claim 7 wherein the base diameter of said cylinder is about 70 μm and the height thereof is about 60 μm.

* * * * *